US012610127B2

(12) United States Patent
Shibata

(10) Patent No.: US 12,610,127 B2
(45) Date of Patent: Apr. 21, 2026

(54) AUTHENTICATION DEVICE, PROCESSING METHOD, AND PROGRAM

(71) Applicant: NEC Corporation, Tokyo (JP)

(72) Inventor: Koyo Shibata, Tokyo (JP)

(73) Assignee: NEC CORPORATION, Tokyo (JP)

( * ) Notice: Subject to any disclaimer, the term of this patent is extended or adjusted under 35 U.S.C. 154(b) by 285 days.

(21) Appl. No.: 18/274,110

(22) PCT Filed: Mar. 30, 2021

(86) PCT No.: PCT/JP2021/013458
§ 371 (c)(1),
(2) Date: Jul. 25, 2023

(87) PCT Pub. No.: WO2022/208642
PCT Pub. Date: Oct. 6, 2022

(65) Prior Publication Data
US 2024/0430560 A1 Dec. 26, 2024

(51) Int. Cl.
*H04N 23/611* (2023.01)
*H04N 23/65* (2023.01)
(52) U.S. Cl.
CPC ......... *H04N 23/611* (2023.01); *H04N 23/651* (2023.01)
(58) Field of Classification Search
CPC .. H04N 23/611; H04N 23/651; H04N 23/667; H04N 23/698; B60R 1/27; B60R 25/25; G07C 2209/63; G07C 9/37
USPC ........................................................ 382/103
See application file for complete search history.

(56) References Cited

U.S. PATENT DOCUMENTS

| | | | | |
|---|---|---|---|---|
| 9,672,627 | B1 * | 6/2017 | Ramaswamy | .......... G06T 7/292 |
| 2004/0136596 | A1 | 7/2004 | Oneda et al. | |
| 2007/0124599 | A1 | 5/2007 | Morita et al. | |
| 2018/0059248 | A1 | 3/2018 | O'Keeffe | |

(Continued)

FOREIGN PATENT DOCUMENTS

| | | |
|---|---|---|
| JP | 2004-180075 A | 6/2004 |
| JP | 2005-130362 A | 5/2005 |
| JP | 2007-145200 A | 6/2007 |

(Continued)

OTHER PUBLICATIONS

European Search Report for EP Application No. 21934815.8, dated on Feb. 23, 2024.

(Continued)

*Primary Examiner* — Stephen P Coleman
(74) *Attorney, Agent, or Firm* — Sughrue Mion, PLLC

(57) ABSTRACT

Degree-of-importance information indicating a degree of a possibility that an authentication target person approaches is acquired for each imaging direction of a plurality of imaging devices. An imaging device with an imaging direction corresponding to a direction for which the degree of the possibility that the person approaches is high is identified based on the degree-of-importance information, as an imaging device with a high degree of importance. For the imaging devices other than the imaging device with the high degree of importance, an image generation parameter to be used in generation of a captured image is set to an image generation parameter with which the power consumption efficiency is increased.

9 Claims, 7 Drawing Sheets

(56)                    References Cited

U.S. PATENT DOCUMENTS

| | | | |
|---|---|---|---|
| 2020/0139931 A1 | 5/2020 | Mukasa et al. |
| 2020/0204724 A1 | 6/2020 | Hwang |

FOREIGN PATENT DOCUMENTS

| | | | |
|---|---|---|---|
| JP | 2008-004050 A | 1/2008 |
| JP | 2009-166737 A | 7/2009 |
| JP | 2010-218039 A | 9/2010 |
| JP | 2014-236492 A | 12/2014 |
| JP | 2019-526056 A | 9/2019 |
| JP | 2020-082954 A | 6/2020 |
| WO | 2017/163488 A1 | 9/2017 |
| WO | 2017/200896 A2 | 11/2017 |
| WO | 2019/003826 A1 | 1/2019 |
| WO | 2019/026985 A1 | 2/2019 |

OTHER PUBLICATIONS

International Search Report for PCT Application No. PCT/JP2021/013458, mailed on May 25, 2021.

* cited by examiner

FIG. 3

AUTHENTICATION DEVICE, PROCESSING METHOD, AND PROGRAM

This application is a National Stage Entry of PCT/JP2021/013458 filed on Mar. 30, 2021, the contents of all of which are incorporated herein by reference, in their entirety.

TECHNICAL FIELD

The present invention relates to an authentication device, a processing method, and a program.

BACKGROUND ART

When performing biometric authentication of a person, it is required that the position of the reflection in the captured image of the living body be close to the front position. Patent document 1, patent document 2, and patent document 3 are disclosed as related techniques.

PRIOR ART DOCUMENTS

Patent Documents

Patent Document 1: Published Japanese Translation No. 2019-526056 of PCT International Publication
Patent Document 2: PCT International Publication No. WO2017/163488
Patent Document 3: Japanese Unexamined Patent Application, First Publication No. 2007-145200
Patent Document 4: PCT International Publication No. WO2019/026985

SUMMARY OF THE INVENTION

Problems to be Solved by the Invention

Patent Document 1 discloses dynamically configuring LIDAR by dynamically allocating LIDAR resources (e.g., laser pulse number or density) according to the relative degree of importance of identified objects.

Patent Document 2 discloses performing authentication using a camera installed at an appropriate position where a user's face image can be acquired.

Patent Document 3 discloses that the degree of risk of unauthorized use is detected using vehicle position information, time, etc., and an authentication level is changed.

In Patent Document 4, as background art, a subject identification device is connected to a plurality of imaging devices, and uses information on the position of a subject contained in an image captured by the imaging device, to select one imaging device among the plurality of the imaging devices and output to the selected imaging device an instruction to increase at least one of the imaging frame rate and image quality of the selected imaging device (for example, Patent Document 0002, etc.).

Incidentally, it is being considered to install a plurality of imaging devices in an area where a user is to be authenticated, and to perform authentication processing based on a captured image obtained from one of these imaging devices. In such a case, it is required to efficiently operate a plurality of imaging devices.

Therefore, an object of the present invention is to provide an authentication device, an authentication method, and a program that solve the above problems.

Means for Solving the Problem

According to a first example aspect of the present invention, an authentication device includes: a degree-of-importance information acquisition means that acquires degree-of-importance information indicating a degree of a possibility that an authentication target person approaches, for each imaging direction of a plurality of imaging devices; an imaging device identifying means that identifies an imaging device with an imaging direction corresponding to a direction for which the degree of the possibility that the person approaches is high, based on the degree-of-importance information, as an imaging device with a high degree of importance; and a resource setting means that sets, for the imaging devices other than the imaging device with the high degree of importance, an image generation parameter to be used in generation of a captured image, to an image generation parameter with which the power consumption efficiency is increased.

According to a second example aspect of the present invention, a processing method includes: acquiring degree-of-importance information indicating a degree of a possibility that an authentication target person approaches, for each imaging direction of a plurality of imaging devices; identifying an imaging device with an imaging direction corresponding to a direction for which the degree of the possibility that the person approaches is high, based on the degree-of-importance information, as an imaging device with a high degree of importance; and setting, for the imaging devices other than the imaging device with the high degree of importance, an image generation parameter to be used in generation of a captured image, to an image generation parameter with which the power consumption efficiency is increased.

According to a third example aspect of the present invention, a program that causes a computer of an authentication device to function as: a degree-of-importance information acquisition means that acquires degree-of-importance information indicating a degree of a possibility that an authentication target person approaches, for each imaging direction of a plurality of imaging devices; an imaging device identifying means that identifies an imaging device with an imaging direction corresponding to a direction for which the degree of the possibility that the person approaches is high, based on the degree-of-importance information, as an imaging device with a high degree of importance; and a resource setting means that sets, for the imaging devices other than the imaging device with the high degree of importance, an image generation parameter to be used in generation of a captured image, to an image generation parameter with which the power consumption efficiency is increased.

Effect of Invention

According to the present invention, when a plurality of imaging devices are installed in an area of the location where a user is to be authenticated, and authentication processing is performed based on the captured images obtained from an imaging device of any of those imaging devices, the plurality of imaging devices can be operated efficiently.

BRIEF DESCRIPTION OF THE DRAWINGS

FIG. 3 is a functional block diagram of an authentication device according to the present example embodiment.

EXAMPLE EMBODIMENT

An authentication system according to one example embodiment of the present invention will be described below with reference to the drawings.

Figure 1:
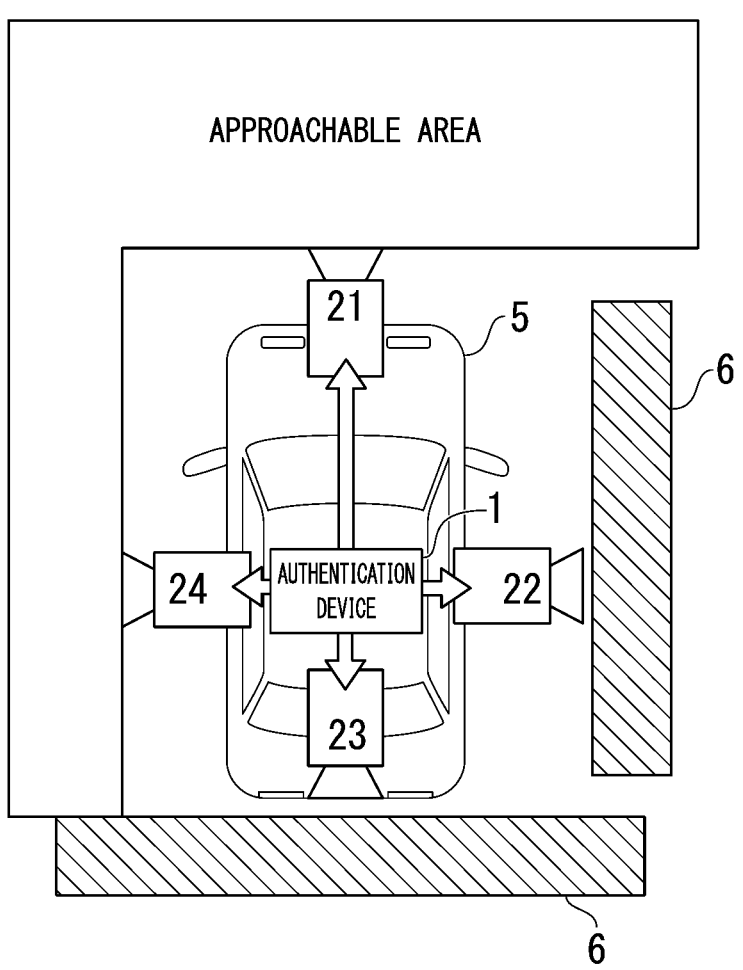
FIG. 1 is a diagram showing an overview of an authentication system including an authentication device according to the present example embodiment.

FIG. 1 is a diagram showing an overview of an authentication system including an authentication device according to the present example embodiment.

As shown in FIG. 1, an authentication system 100 according to the present example embodiment includes an authentication device 1 (processing device) and an imaging device 2 provided inside a vehicle 5. The authentication device 1 is communicably connected with each of a first imaging device 21 whose imaging direction is the direction of the windshield (first imaging direction), a second imaging device 22 whose imaging direction is the direction of the right window glass (second imaging direction), a third imaging device 23 whose imaging direction is the direction of the rear glass (third imaging direction), and a fourth imaging device 24 whose imaging direction is the direction of the left window glass (fourth imaging direction). The first imaging device 21 to the fourth imaging device 24 are collectively referred to as imaging device 2. In the present example embodiment, the authentication system 100 has the imaging device 2 corresponding to the four imaging directions of the first to fourth imaging directions. However it may have imaging devices 2 corresponding to other imaging directions.

Figure 2:
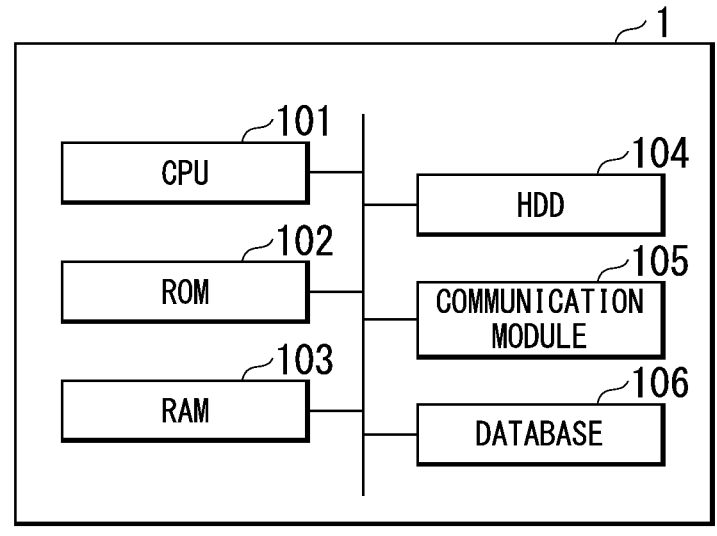
FIG. 2 is a hardware configuration diagram of an authentication device according to the present example embodiment.

FIG. 2 is a hardware configuration diagram of the authentication device.

As shown in this figure, the authentication device 1 is a computer including various hardware such as a CPU (Central Processing Unit) 101, a ROM (Read Only Memory) 102, a RAM (Random Access Memory) 103, a HDD (Hard Disk Drive) 104, a communication module 105, and a database 106.

Figure 3:
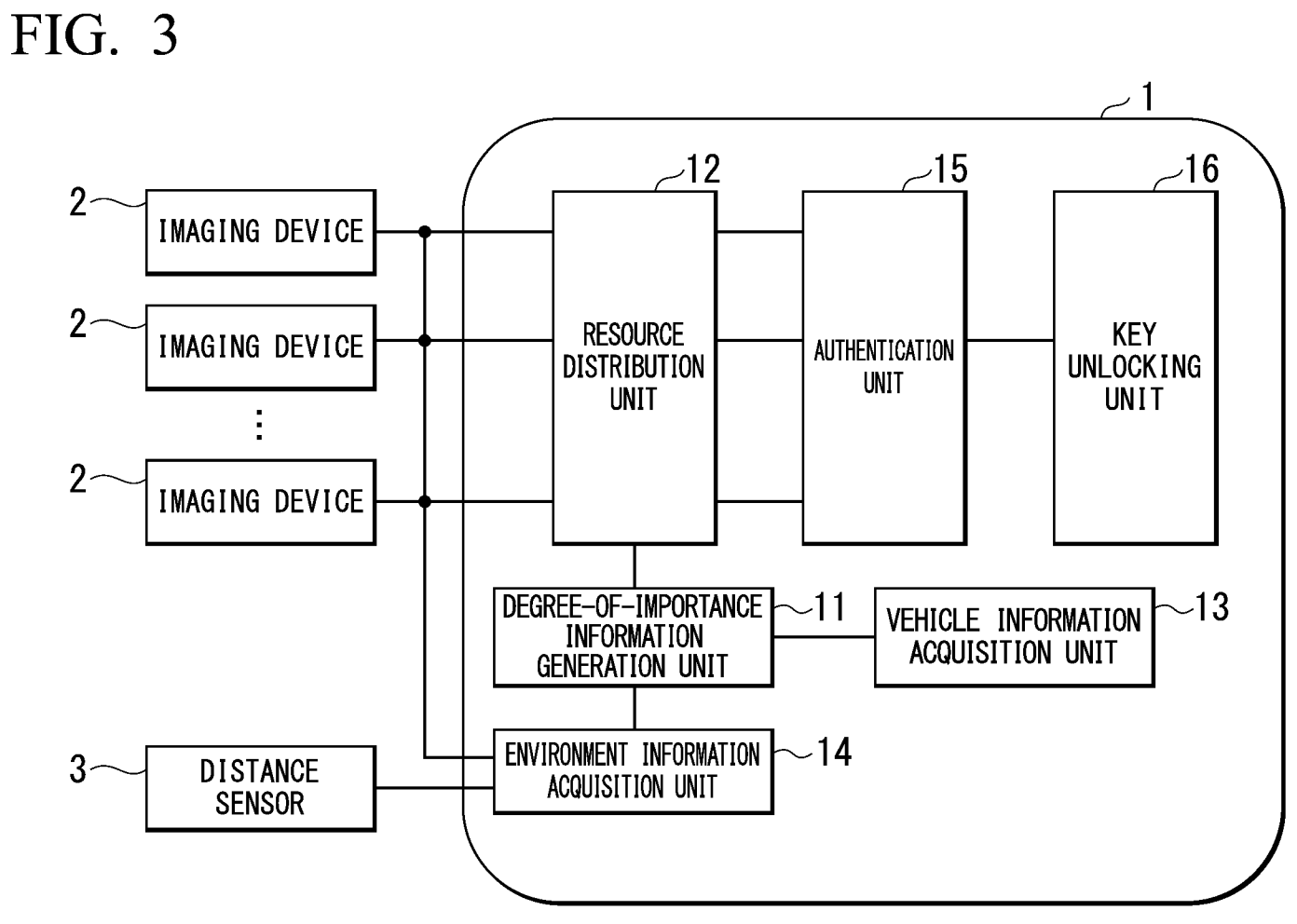

FIG. 3 is a functional block diagram of the authentication device.

The authentication device 1 activates an authentication control program. As a result, the authentication device 1 exhibits various functions of a degree-of-importance information generation unit 11, a resource distribution unit 12 (degree-of-importance information acquisition means, imaging device identification means, resource setting means), a vehicle information acquisition unit 13, an environment information acquisition unit 14, an authentication unit 15, and a key unlocking unit 16.

The degree-of-importance information generation unit 11 generates degree-of-importance information indicating the degree to which an authentication target person may approach, for each different imaging direction captured by the plurality of imaging devices 2. The degree-of-importance information may be defined as a probability map indicating probabilities of an authentication target person approaching.

Based on the degree-of-importance information, the resource distribution unit 12 identifies the imaging device 2 with the imaging direction corresponding to a direction for which the degree to which a person may approach is high, as the imaging device 2 with a high degree of importance. The resource distribution unit 12 sets the image generation parameter to be used in the generation of a captured image for the imaging device 2 other than the imaging device 2 with a high degree of importance, to an image generation parameter that increases the power consumption efficiency. In addition, the resource distribution unit 12 sets the image generation parameter to be used in the generation of a captured image for the imaging device 2 with a high degree of importance, to the image generation parameter that increases the authentication accuracy, within a range in which the total power consumption of the plurality of imaging devices 2 is reduced.

The vehicle information acquisition unit 13 acquires information indicating that the vehicle 5 has parked.

The environment information acquisition unit 14 acquires distance information corresponding to each imaging direction based on the sensing information of the distance sensor 3.

The authentication unit 15 uses the captured image of the imaging device 2 to perform authentication processing.

The key release unit 16 releases keys such as door locks based on the processing result of the authentication unit 15.

Based on the degree-of-importance information, the authentication device 1 in the present example embodiment identifies the imaging device 2 with the imaging direction corresponding to a direction in which the person is likely to approach, from among the plurality of imaging devices 2, and based on the degree-of-importance information, identifies an imaging device 2 with an imaging direction corresponding to a direction for which the degree to which a person may approach is high, as an imaging device 2 with a high degree of importance. Then, the authentication device 1 sets an image generation parameter to be used in the generation of a captured image for the imaging device 2 other than the imaging device 2 with a high degree of importance, to an image generation parameter that increases the power consumption efficiency, and sets the image generation parameters to be used in the generation of the captured image for the imaging device 2 with a high degree of importance to within a range in which the total power consumption of the plurality of imaging devices 2 is reduced, to image generation parameters that increase the authentication accuracy. As a result, the authentication device 1 improves the power consumption efficiency of the entire authentication system 100 including the plurality of imaging devices 2. In addition, the captured image generated by the imaging device 2 with a high degree of importance is a captured image that maintains the eligibility used for authentication of the captured image, while reducing the overall power consumption of the authentication system 100. Therefore, it is possible to continuously generate an appropriate captured image as a captured image to be used for the purpose of authenticating the authentication target person.

FIRST EXAMPLE EMBODIMENT

Figure 4:
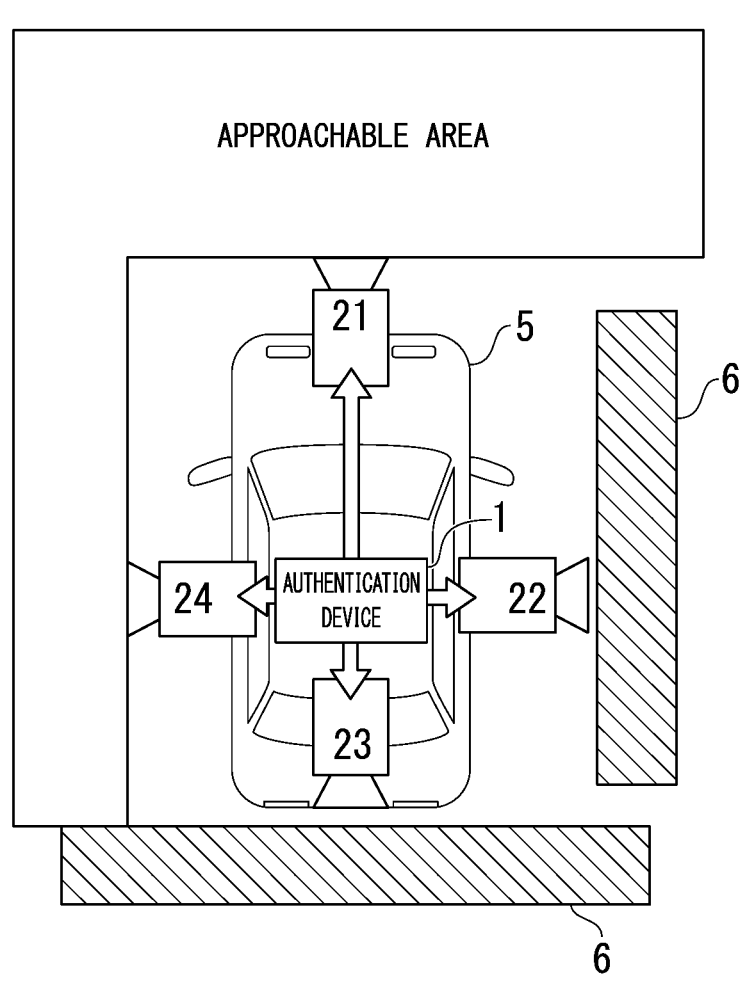
FIG. 4 is a first diagram showing an outline of degree-of-importance information according to the present example embodiment.

FIG. 4 is a first diagram showing an outline of degree-of-importance information.

Assume that the vehicle 5 is parked in a position where the fence 6 stands in the vicinity of the vehicle body in the rear and right direction. In this case, a person such as a driver is expected to leave in the front or left direction, and when the person returns to the vehicle 5, is expected to come toward the vehicle 5 from the same front or left direction. An authentication device 1 provided in the vehicle 5 performs control to automatically image a person approaching the vehicle, performs authentication using the captured image, and unlocks the door when the authentication succeeds. In the case where the vehicle 5 is parked in such a state that the right side and the rear side are closed as shown in FIG. 4, the important imaging directions at the time of authentication are the front side and the left side.

In such a case, the authentication device 1 determines that the front and left directions are more likely to be approached by a person, and generates degree-of-importance information that indicates "approachable area" information indicating that the front and left direction areas have a high degree of importance, and that does not include "approachable area" information in other directions (rightward and rearward). The degree-of-importance information may be array information indicating the degree of importance corresponding to each pixel of the bird's-eye view image centering on the vehicle 5. The authentication device 1 generates a bird's-eye view image using the imaging device 2, and generates array information indicating the degree of importance corresponding to each pixel of the bird's-eye view image. For example, the authentication device 1 determines that an imaging direction away from the object in which the distance information from the imaging device 2 to an adjacent object is 2 m or more is an "approachable area", and generates degree-of-importance information indicating degree of importance corresponding to the determination result. Note that the authentication device 1 may generate degree-of-importance information indicating three or more degrees of importance according to the distance from the imaging device 2 to the object. For example, when the distance from the imaging device 2 to the object is less than 1 m, the authentication device 1 may determine to give "0", which is the lowest degree of importance, and when the distance from the imaging device 2 to the object is 1 m or more and less than 2 m, the degree of importance may be determined to be "1", which is intermediate, and when the distance from the imaging device 2 to the object is 2 m or more, the degree of importance may be determined to be "2", which is the highest. In this case, the authentication device 1 generates, in the rectangular range of the bird's-eye view image of the vehicle 5, degree-of-importance information which is array information in which the information of the degree of importance "2" indicating "approachable area" is assigned to the array corresponding to the pixels of the area determined to have the degree of importance "2" and the information of the degree of importance "1" and "0", which does not indicate "approachable area", is assigned to the array corresponding to the pixels of the areas determined to have the degree of importance "1" and "0".

Then in the case such as shown in FIG. 4, the authentication device 1 uses the degree-of-importance information to identify the first imaging device 21 whose imaging direction is the front, and the fourth imaging device 24 whose imaging direction is the left direction, as the imaging devices 2 that are responsible for imaging in an imaging range of a high degree of importance. In this case, the authentication device 1 sets the image generation parameters to be used in the generation of a captured image for the second imaging device 22 and the third imaging device 23, which are the imaging devices 2 other than the first imaging device 21 and the fourth imaging device 24 with a high degree of importance, to image generation parameters that at least improve the power consumption efficiency. The authentication device 1 may set the image generation parameters to be used in the generation of a captured image for the first imaging device 21 and the fourth imaging device 24 with a high degree of importance, to an image generation parameter that increases authentication accuracy within a range in which the total power consumption of the plurality of imaging devices is reduced, and.

Figure 5:
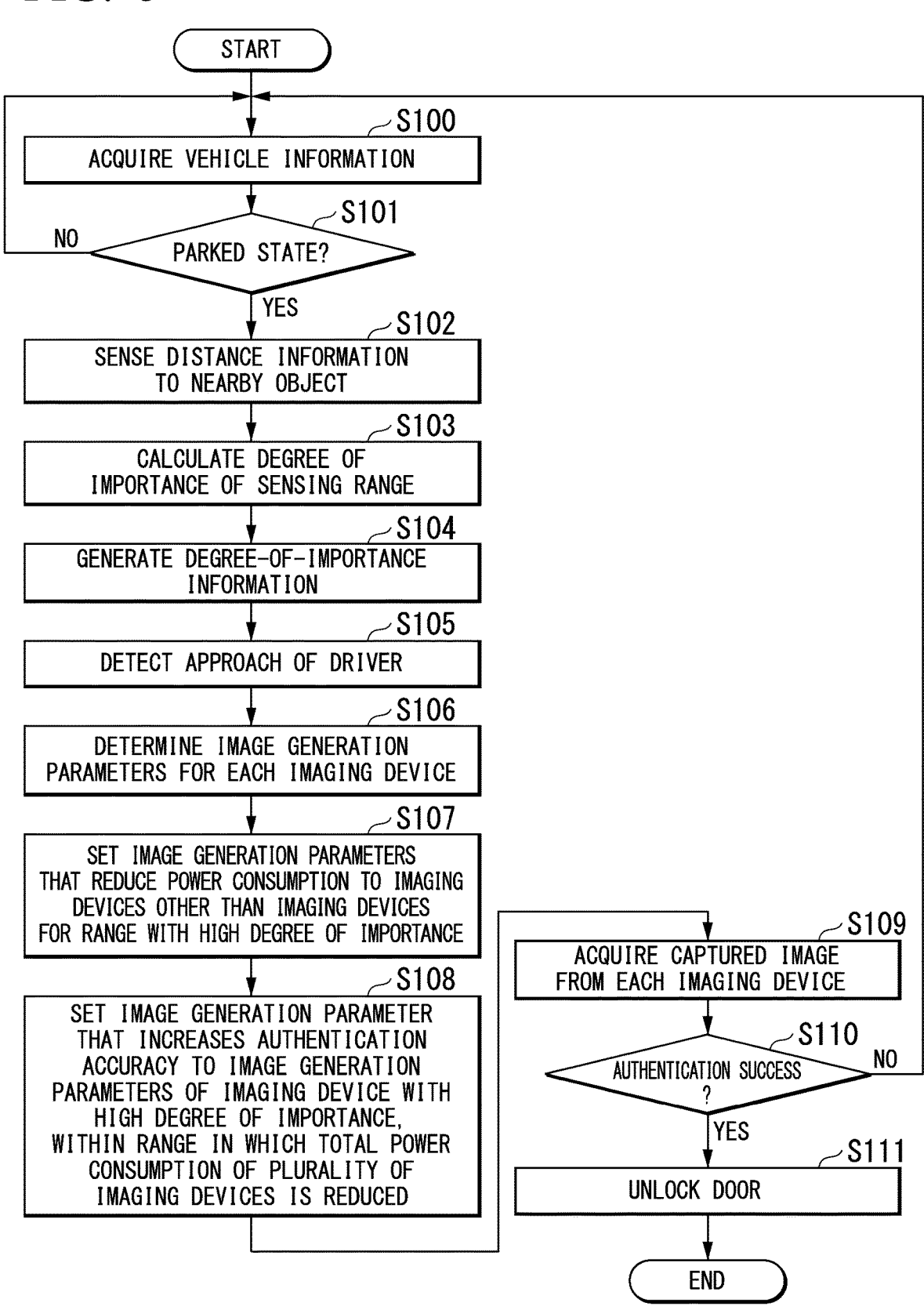
FIG. 5 is a diagram showing a processing flow of the authentication device according to the present example embodiment.

FIG. 5 is a diagram showing the processing flow of the authentication device.

Next, the processing flow of the authentication device will be explained step by step.

The vehicle information acquisition unit 13 of the authentication device 1 acquires position information from the sensor that detects the position of the shift lever (step S100). The vehicle information acquisition unit 13 determines whether the vehicle 5 is in a parked state based on whether the position information of the shift lever is the parked "P" position (step S101). The vehicle information acquisition unit 13 instructs the degree-of-importance information generation unit 11 to generate degree-of-importance information, when the position information of the shift lever indicates the parked "P" position. The vehicle information acquisition unit 13 may determine that the vehicle is parked based on vehicle information acquired from a sensor provided in another vehicle 5.

Upon obtaining the instruction to generate degree-of-importance information, the degree-of-importance information generation unit 11 instructs the environment information acquisition unit 14 to acquire environment information. The environmental information acquisition unit 14 controls the distance sensors 3 provided on the front, rear, left, and right of the vehicle 5 to sense distance information to nearby objects (step S102). The distance sensor 3 emits infrared light or radar, for example, and calculates the distance to a nearby object based on the light emission timing, and the light reception timing of the reflected light. As an example, the distance sensor 3 is provided on the vehicle 5 according to the imaging direction of each of the first imaging device 21 to the fourth imaging device 24. The distance sensor 3 may calculate the distance to a nearby object located in the sensing range corresponding to the imaging range of each imaging device 2. The distance sensor 3 may also calculate, for example, the distance to an object at each position (sensing range) in the horizontal direction at the height at which the own device is installed. The environment information acquisition unit 14 acquires distance information of the sensing range from each of the front, rear, left, and right distance sensors 3. Note that the distance sensor 3 may be a device such as Lidar that detects the distance to each object in the imaging range for each pixel and generates a distance image. The environment information acquisition unit 14 may acquire distance information of the sensing range, based on the distance information of each pixel included in the distance image. Alternatively, the imaging device 2 itself may operate as the distance sensor 3 that generates the distance image.

The degree-of-importance information generation unit 11 acquires distance information of the sensing range from each distance sensor 3. The degree-of-importance information generation unit 11 calculates the degree of importance of the sensing range based on the distance information of the sensing range obtained from the distance sensor 3 (step S103). For example, it is assumed that the distance information of the sensing range is each horizontal distance information for the height at which the distance sensor 3 is installed. In this case, the degree-of-importance information generation unit 11 determines the degree of importance corresponding to the closest distance information among the pieces of distance information in that horizontal direction range as the degree of importance of that sensing range. Note that the farther the distance information is, the higher the degree of importance is.

The degree-of-importance information generation unit 11 may determine a degree of importance as "0" when the closest distance information among the pieces of distance information in the horizontal direction range is less than 1 m, a degree of importance as "1" when the distance information is 1 m or more and less than 2 m, and a degree of importance as "2", which is the highest value, when the distance information is 2 m or more. The degree-of-importance information generation unit 11 may determine the degree of importance of the sensing range by other methods. Suppose that, based on the distance information obtained from the distance sensor 3 whose sensing range is in the forward direction, the degree-of-importance information generation unit 11 identifies the first imaging range corresponding to that sensing range as having a degree of importance of "2"; based on the distance information obtained from the distance sensor 3 whose sensing range is in the right direction, it identifies the second imaging range corresponding to that sensing range as having a degree of importance of "0"; based on the distance information obtained from the distance sensor 3 whose sensing range is in the rear direction, it identifies the third imaging range corresponding to that sensing range as having a degree of importance of "0"; and, based on the distance information obtained from the distance sensor 3 whose sensing range is in the left direction, it identifies the fourth imaging range corresponding to that sensing range as having a degree of importance of "2". In this case, the degree-of-importance information generation unit 11 generates, among the pixels of the rectangular bird's-eye view image centering the vehicle 5 excepting the range of the center vehicle 5, degree-of-importance information including degree of importance array information corresponding to each pixel in which the degree of importance corresponding to each pixel of the front and left range of the vehicle 5 is set to "2", and the degree of importance corresponding to each pixel of the right and rear range is set to "0" (step S104). The degree-of-importance information generation unit 11 records degree-of-importance information in a memory or the like.

Here, the degree-of-importance information generation unit 11 may repeat generation of degree-of-importance information at a predetermined timing. For example, the degree-of-importance information generation unit 11 may repeat generation of degree-of-importance information at predetermined time intervals, and record the latest degree-of-importance information in a storage unit such as a memory. The degree-of-importance information generation unit 11 may detect communication connection with a portable device such as a smart key or a portable terminal held by the driver, and generate degree-of-importance information at the timing of the detection. For example, when the driver parks the vehicle 5 and leaves, and then returns to the vehicle 5, the authentication device 1 may generate the degree-of-importance information upon the communication connection between the authentication device 1 and the portable device. As a result, it is possible to generate and store the latest degree-of-importance information based on the latest states of nearby objects. For example, in a parking lot, other vehicles parked adjacently may move. Then, there is a possibility that the direction in which the driver returns to the vehicle 5 will change. In this case, since the degree-of-importance information indicating the degree to which an authentication target person may approach will change, it is desirable that the authentication device 1 can generate and store degree-of-importance information corresponding to the latest state of the nearby object.

When the vehicle 5 is parked and the driver returns to the vehicle 5 after a while, the authentication device 1 detects the approach of the driver through communication connection with the portable device (step S105). The resource distribution unit 12 then acquires the degree-of-importance information from the memory. The resource distribution unit 12 acquires degree-of-importance information corresponding to each pixel of the bird's-eye view image indicated by the degree-of-importance information. The resource distribution unit 12 determines image generation parameters for each imaging device 2 based on the degree-of-importance information (step S106).

In other words, the resource distribution unit 12 determines an image generation parameter to be set for the first imaging device 21, based on the degree-of-importance information corresponding to each pixel in the front direction, which is the imaging direction of the first imaging device 21. Similarly, the resource distribution unit 12 determines an image generation parameter to be set for the second image capturing device 22, based on the degree-of-importance information corresponding to each pixel in the right direction, which is the imaging direction of the second image capturing device 22. Similarly, the resource distribution unit 12 determines an image generation parameter to be set for the third imaging device 23, based on the degree-of-importance information corresponding to each pixel in the right direction, which is the imaging direction of the third imaging device 23, and determines the image generation parameter to be set for the fourth imaging device 24, based on the degree-of-importance information corresponding to each pixel in the left direction, which is the imaging direction of the fourth imaging device 24.

As shown in FIG. 4, it is supposed that, among the pixels of the rectangular bird's-eye view image centered on the vehicle 5 excluding the range of the vehicle 5 in the center, the degree of importance corresponding to each pixel in the range in front and to the left of the vehicle 5 is set to "2", and the degree of importance corresponding to each pixel in the range to the right and in the rear is set to "0".

In this case, the resource distribution unit 12 sets the image generation parameters of the second imaging device 22 and the third imaging device 23 for imaging the right direction and the rear, which are imaging directions other than the imaging direction whose degree of importance is "2", to the image generation parameters that reduce power consumption (step S107). For example, the resource distribution unit 12 reduces the frame rate at which the second imaging device 22 and the third imaging device 23 generate captured images. As a result, the power consumption of the second imaging device 22 and the third imaging device 23 can be reduced. Note that in the image generation processing of the second imaging device 22 and the third imaging device 23, the resource distribution unit 12 may determine image generation parameters so that the compression method is set to "high" or compression ratio is set to "high", and set these to the second imaging device 22 and the third imaging device 23. As a result, by using highly compressed captured images, the second imaging device 22 and the third imaging device 23 can reduce the memory capacity for recording the captured images, thereby improving the memory utilization efficiency.

In addition, the resource distribution unit 12, within a range in which the total power consumption of the plurality of imaging devices 2 constituting the authentication system 100 is reduced, sets the image generation parameters that increase authentication accuracy for the image generation parameters of the first imaging device 21 and the fourth imaging device 24 whose imaging ranges are the forward and left directions, which are the imaging directions with a degree of importance of "2" (step S108). Specifically, the resource distribution unit 12 sets to "High" the frame rate used by the first imaging device 21 and the fourth imaging device 24 to generate captured images, within a range in which the total power consumption of the plurality of imaging devices 2 is reduced. By setting the frame rate to "High", the number of captured images generated per unit time is increased, and by performing the authentication processing using each captured image, the number of authentication attempts is increased, and reliable authentication can be performed in a shorter time. In addition, in the image generation processing for the first imaging device 21 and the fourth imaging device 24, the resource distribution unit 12 may set the compression method or compression rate to "low" compared to for the other imaging devices 2. By setting the compression method to "low" or the compression rate to "low", authentication is performed using a captured image in which unnecessary image information is not reduced, so authentication accuracy can be maintained.

Note that the resource distribution unit 12 may set an algorithm for performing authentication using captured images acquired from the second imaging device 22 and the third imaging device 23, which are imaging devices other than the imaging devices in the imaging range with a high degree of importance, to a simple authentication algorithm with a small amount of processing. As a result, power consumption of the authentication system 100 as a whole can be reduced, and power consumption efficiency can be improved.

Each imaging device 2 for which the image generation parameters have been set by the processing of the resource distribution unit 12, generates a captured image that has been captured based on the settings. The authentication unit 15 of the authentication device 1 acquires a captured image from each imaging device 2 that is to be driven (step S109). The authentication unit 15 performs authentication by comparing the face information of the person included in the acquired captured image with the face image of the driver stored in advance (step S110). Known technology may be used for the authentication technology. The authentication unit 15 determines whether the authentication has succeeded. When the authentication is successful, the authentication unit 15 outputs information indicating the authentication success to the key unlocking unit 16. When the key unlocking unit 16 acquires the information indicating the successful authentication, it unlocks the door (step S111). If the authentication is not successful, the authentication unit 15 repeats the authentication process using a captured image in which a person's face is captured, based on captured images sequentially acquired from the respective imaging devices 2.

According to the above process, the authentication device 1 identifies the imaging device 2 with the imaging direction corresponding to the direction in which a person is likely to approach based on the degree-of-importance information, as the imaging device with a high degree of importance. Then, the authentication device 1 sets the image generation parameter to be used in the generation of a captured image for the imaging devices 2 other than the imaging device 2 with a high degree of importance, to an image generation parameter with which the power consumption efficiency is improved. In addition, the authentication device 1 sets the image generation parameter to be used in the generation of a captured image for the imaging device 2 with a high degree of importance, to an image generation parameter with high authentication accuracy, in a state where the total power consumption of the plurality of imaging devices 2 constituting the authentication system 100 is reduced. As a result, the authentication device 1 improves the power consumption efficiency of the authentication system 100 as a whole, and suitability for use in the authentication processing of the captured image generated by the imaging device 2 with the imaging direction corresponding to the direction in which a person is likely to approach, can be maintained.

SECOND EXAMPLE EMBODIMENT

Figure 6:
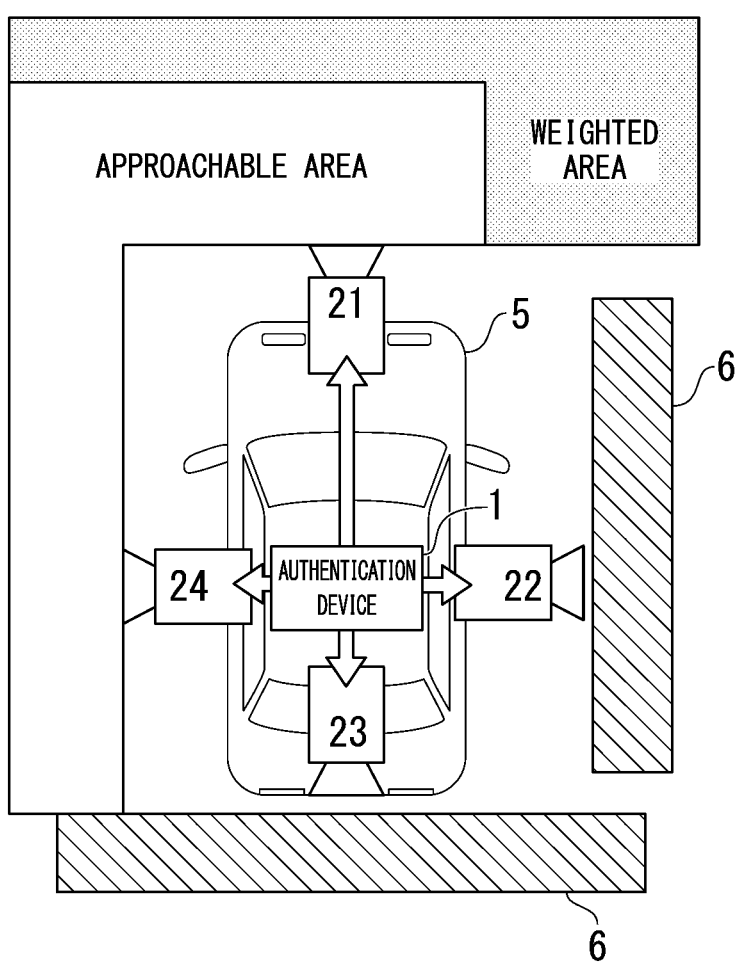
FIG. 6 is a second diagram showing an outline of degree-of-importance information according to the present example embodiment.

FIG. 6 is a second diagram showing an outline of degree-of-importance information.

A person who gets off the vehicle 5 and moves, is likely to return to the vehicle 5 from the same direction as their moving direction, when returning to the vehicle 5. Therefore, the authentication device 1 may detect the direction of movement of the person who gets off the vehicle 5, and generate degree-of-importance information by further increasing the degree of importance set in the range of the direction of movement.

The vehicle information acquisition unit 13 acquires position information and a door closing signal from a sensor that detects the position of the shift lever. The vehicle information acquisition unit 13 determines whether the position information of the shift lever is the parked "P" position. The vehicle information acquisition unit 13 instructs the degree-of-importance information generation unit 11 to generate degree-of-importance information, when the position information of the shift lever indicates the parked "P" position.

Upon obtaining the instruction to generate degree-of-importance information, the degree-of-importance information generation unit 11 instructs the environment information acquisition unit 14 to acquire environment information. The environment information acquisition unit 14 controls the distance sensors 3 provided on the front, rear, left, and right of the vehicle 5 to sense distance information to nearby objects. The distance sensors 3 emit infrared light or radar, for example, and calculate the distance to a nearby object based on the light emission timing, and the light reception timing of the reflected light. As an example, the distance sensors 3 are provided on the vehicle 5 according to the imaging direction of each of the first imaging device 21 to the fourth imaging device 24. The distance sensor 3 may calculate the distance to a nearby object located in the sensing range corresponding to the imaging range of each imaging device 2. The distance sensor 3 may also calculate, for example, the distance to an object at each position (sensing range) in the horizontal direction at the height at which the own device is installed. The distance sensor 3 calculates the distance information to the object every time the time elapses, such as every second. The environment information acquisition unit 14 repeatedly acquires the distance information of the sensing range from the front, rear, left, and right distance sensors 3 at predetermined time intervals, such as every second, for a predetermined period, such as 30 seconds.

The degree-of-importance information generation unit 11 acquires distance information for each sensing range from the environment information acquisition unit 14. The degree-of-importance information generation unit 11 identifies a sensing range in which the distance to the object is increasing, based on the change over time of the distance information of each sensing range. The sensing range in which the distance to the object is increasing can be estimated as the range in the direction in which the person leaves the vehicle 5 and walks away. The distance information of the sensing range may be each horizontal distance information for the height at which the distance sensor 3 is installed. Further, the degree-of-importance information generation unit 11 determines the degree of importance corresponding to the closest distance information, as the degree of importance of that sensing range, based on the last obtained pieces of distance information among the repeatedly obtained pieces of distance information of the horizontal range. Note that the farther the distance information is, the higher the degree of importance is. The degree-of-importance information generation unit 11 performs multiplication using a weighting factor so that the degree of importance of the sensing range in which the distance to the object increases with the lapse of time is further increased, and the degree of importance of the range of the direction in which the person is likely to return is increased.

For example, the degree-of-importance information generation unit 11 may determine a degree of importance of "0" when the closest distance information among the pieces of distance information in the horizontal direction range is less than 1 m, a degree of importance of "1" when the distance information is 1 m or more and less than 2 m, and a degree of importance of "2" when the distance information is 2 m or more. Then, the degree-of-importance information generation unit 11 multiplies the degree of importance of the sensing range in which the distance to the object increases with the lapse of time, by a weighting factor $\alpha$ ($\alpha$>1). The degree-of-importance information generation unit 11 may determine the degree of importance of the sensing range by other methods.

More specifically, supposing that based on the distance information obtained from the distance sensor 3 whose sensing range is in the forward direction, the degree-of-importance information generation unit 11 identifies the first imaging range corresponding to that sensing range as having a degree of importance of "2"; based on the distance information obtained from the distance sensor 3 whose sensing range is in the right direction, it identifies the second imaging range corresponding to that sensing range as having a degree of importance of "0"; based on the distance information obtained from the distance sensor 3 whose sensing range is in the rear direction, it identifies the third imaging range corresponding to that sensing range as having a degree of importance of "0"; and, based on the distance information obtained from the distance sensor 3 whose sensing range is in the left direction, it identifies the fourth imaging range corresponding to that sensing range as having a degree of importance of "2". Furthermore, the degree-of-importance information generation unit 11 multiplies the degree of importance of the sensing range in which the distance to the object increases with the lapse of time by a weighting factor $\alpha$ ($\alpha$>1).

In this case, among the pixels of the rectangular bird's-eye view image centering on the vehicle 5 excluding the range of the vehicle 5 in the center, the degree-of-importance information generation unit 11 generates, as degree-of-importance information, the degree of importance array information corresponding to each pixel in which the degree of importance corresponding each pixel in the front and left ranges of the vehicle 5 is set to "2", the degree of importance in which the degree of importance of the sensing range in which the distance to the object increases with the lapse of time in the front and left ranges is multiplied by a weighting factor $\alpha$ ($\alpha$>1) is set to '2$\alpha$", and the degree of importance corresponding to each pixel in the right and rear ranges is set to "0". The degree-of-importance information generation unit 11 records degree-of-importance information in a memory or the like.

The degree-of-importance information generation unit 11 may identify the trajectory of the person's movement in the bird's-eye view image centering on the vehicle 5, based on the distance information, and multiply the degree of importance according to the pixels of the position of the trajectory of the person's movement, with a weighting factor $\alpha$. The resource distribution unit 12 may set the image generation parameters by a similar method as described above when setting the image generation parameters for each imaging device 2, based on such degree-of-importance information.

By the above processing, the image generation parameters of each imaging device 2 can be determined in the same manner as in the first example embodiment, based on the degree-of-importance information in which the degree of importance of the range in which the vehicle 5 is likely to be approached is increased.

THIRD EXAMPLE EMBODIMENT

Figure 7:
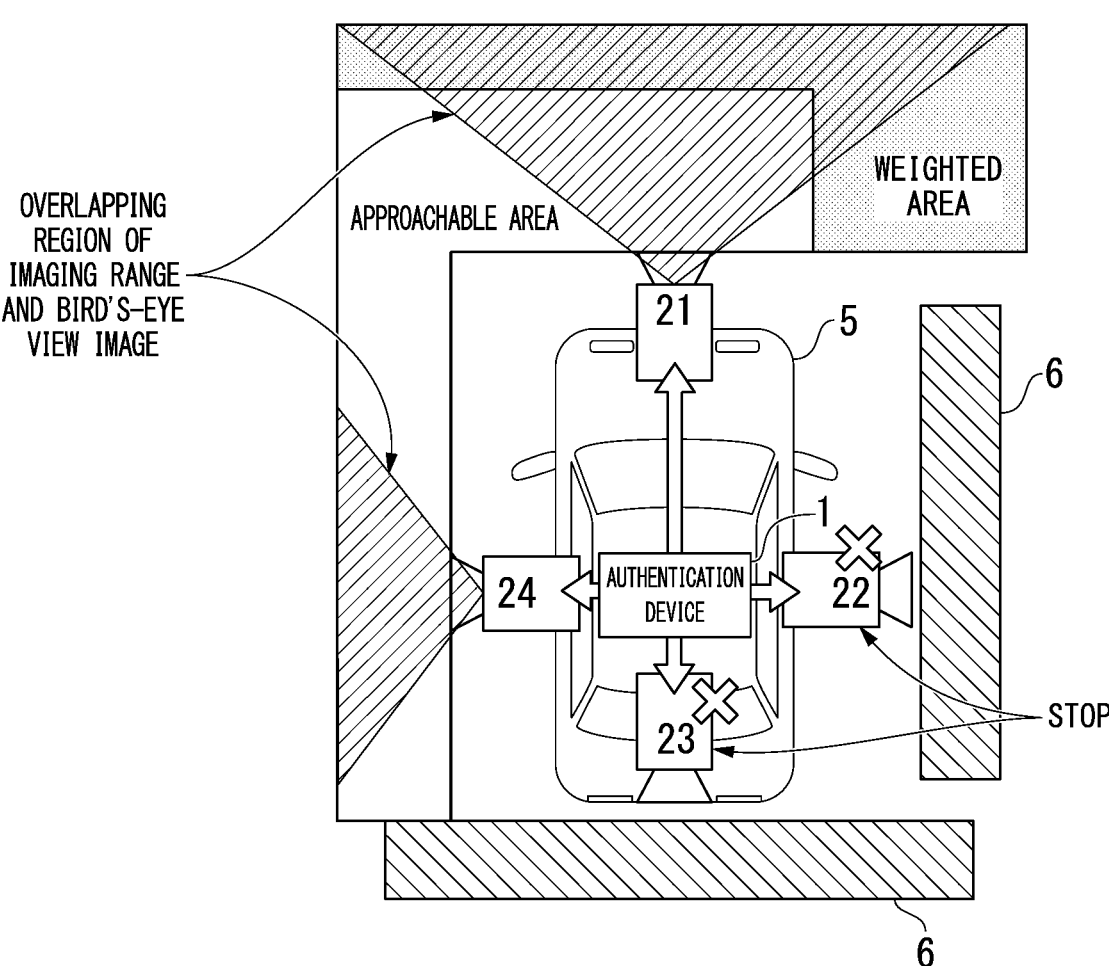
FIG. 7 is a third diagram showing an overview of degree-of-importance information according to the present example embodiment.

FIG. 7 is a third diagram showing an overview of degree-of-importance information.

When the authentication device 1 sets image generation parameters for reducing the power consumption of the imaging devices 2 other than the imaging device 2 with a high degree of importance, to the other imaging devices 2, the imaging operation of those imaging devices 2 can be stopped. For example, as in FIG. 4 and FIG. 6, it is supposed that based on the distance information obtained from the distance sensor 3 whose sensing range is in the right direction, the second imaging range corresponding to that sensing range is identified as having a degree of importance of "0", and based on the distance information obtained from the distance sensor 3 whose sensing range is in the rear direction, the third imaging range corresponding to that sensing range is identified as having a degree of importance of "0". In this case, the resource distribution unit 12 may set the resources to be allocated to the second imaging device 22 and the third imaging device 23 to be zero, and stop the imaging.

Further, the authentication device may identify the number of pixels included in the specified imaging range in the bird's-eye view image of the imaging device 2, based on the pixels in the overlapping region of the imaging range and the bird's-eye view image, and calculate the distribution ratio of power consumption based on the ratio of the number of pixels for each imaging device. In this case, the resource distribution unit 12 may take each pixel as 1 and multiply the value by a weight $\beta$ ($\beta$>1) according to the degree-of-importance information, and calculate the distribution ratio so that the ratio becomes larger for the imaging rage having a larger overlap region of pixels with high degree of importance. The resource distribution unit 12 may set predetermined image generation parameters to each imaging device 2, according to the distribution ratio of each imaging device.

FOURTH EXAMPLE EMBODIMENT

In the example of the other example embodiments described above, based on the distance information obtained from the distance sensor 3, the degree of importance is calculated according to the pixels in each imaging direction of the bird's-eye view image centering on the vehicle 5. However, based on geographic information such as a map, the degree of importance corresponding to pixels in each imaging direction of the bird's-eye view image centering on the vehicle 5 may be calculated, and it is also possible to generate degree-of-importance information with a high degree of importance for the imaging direction corresponding to a direction in which the authentication target person is likely to approach. For example, the degree-of-importance information generation unit 11 of the authentication device 1 acquires via the vehicle information acquisition unit 13, map information output from a navigation device or the like, the current position of the vehicle 5, and information on the direction ahead of the vehicle 5. The degree-of-importance information generation unit 11 of the authentication device 1 acquires these pieces of information. The degree-of-importance information generation unit 11 detects the positions of buildings around the vehicle 5 and the positions of roads, based on the parking position of the vehicle 5, the forward direction of the vehicle 5, and the map information. When the distance between the position of the vehicle 5 and the position of the building is less than a predetermined distance, the degree-of-importance information generation unit 11 determines that the imaging direction of the building has a low degree of importance. If there is no building between the vehicle 5 and the position of a nearby road, the degree-of-importance information generation unit 11 determines that the imaging direction corresponding to the direction of that road has a high degree of importance. Then based on the degree of importance of each direction, the degree-of-importance information generation unit 11 generates degree-of-importance information indicating the arrangement of the degree of importance of each pixel corresponding to each imaging direction of the bird's-eye view image. Thus, degree-of-importance information can be generated using map information (geographic information).

FIFTH EXAMPLE EMBODIMENT

The authentication device 1 may change the image generation parameters set for each imaging device 2 according to the weather and brightness, so that the image is suitable for authentication. For example, the vehicle information acquisition unit 13 acquires weather information, illuminance information, and time information, from a car navigation device or an illuminance sensor. When it is determined that the outside of the vehicle 5 is dark, based on the weather information, the illumination information, and the time information, the degree-of-importance information generation unit 11 may set the frame rate of the imaging device 2 corresponding to the imaging direction with a high degree of importance to "High", so that it is possible to generate a captured image that increases the authentication accuracy. As a result, the number of captured images generated per unit time is increased, and authentication processing is performed using each captured image, thereby increasing the number of authentication attempts and performing more reliable authentication.

Figure 8:
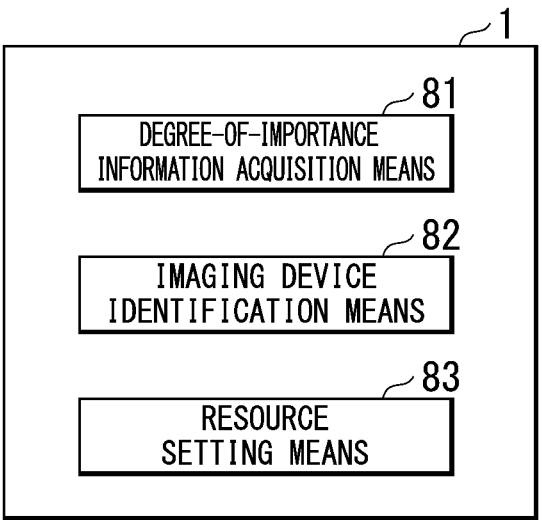
FIG. 8 is a diagram showing a minimum configuration of an authentication device according to the present example embodiment.

FIG. 8 is a diagram showing a minimum configuration of an authentication device.

Figure 9:
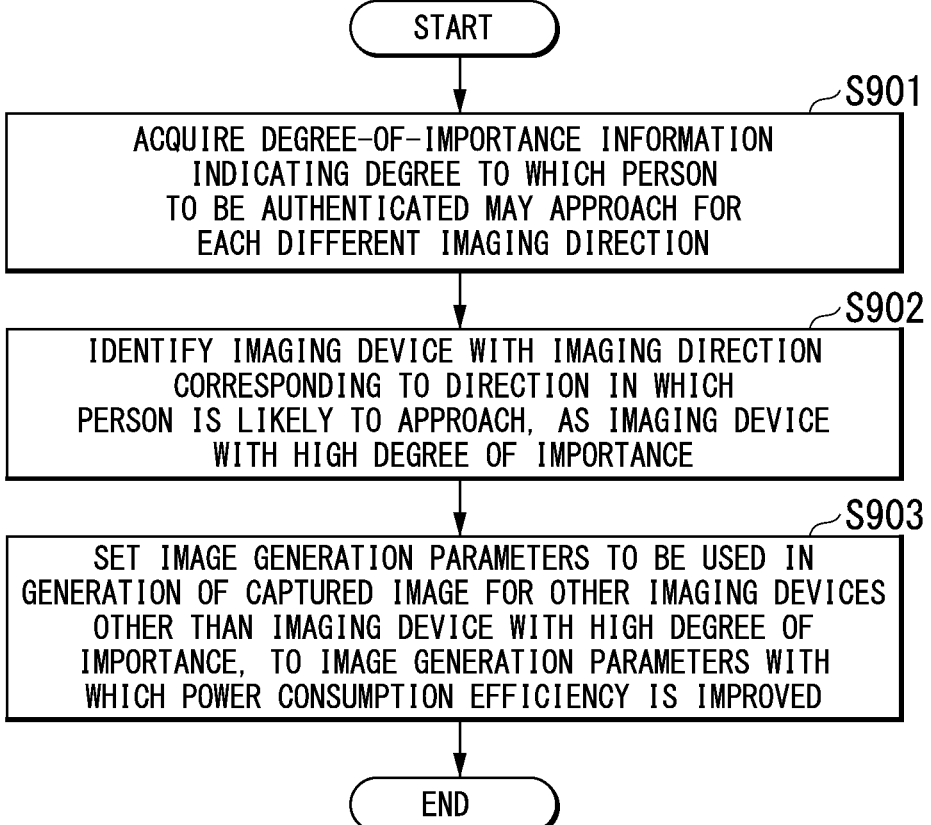
FIG. 9 is a diagram showing a processing flow of the authentication device with a minimum configuration according to the present example embodiment.

FIG. 9 is a diagram showing the processing flow of the authentication device with the minimum configuration.

The authentication device 1 includes at least a degree-of-importance information acquisition means 81, an imaging device identification means 82, and a resource setting means 83.

The degree-of-importance information acquisition means 81 acquires degree-of-importance information indicating the degree to which a authentication target person may approach, for each different imaging direction captured by the plurality of imaging devices 2 (step S901).

Based on the degree-of-importance information, the imaging device identifying means 82 identifies the imaging device 2 with the imaging direction corresponding to the direction in which a person is likely to approach as the imaging device 2 with a high degree of importance (step S902).

The resource setting means 83 sets the image generation parameters to be used in the generation of a captured image for the other imaging devices other than the imaging device 2 with a high degree of importance, to image generation parameters with which the power consumption efficiency is improved (step S903).

Each of the devices mentioned above has a computer system inside. Furthermore, the process of each process described above is stored in a computer-readable recording medium in the form of a program, and the above processes are performed by reading and executing this program by a computer. Here, the computer-readable recording medium refers to a magnetic disk, a magneto-optical disk, a CD-ROM, a DVD-ROM, a semiconductor memory, and the like. Alternatively, the computer program may be distributed to a computer via a communication line, and the computer receiving the distribution may execute the program.

Also, the above program may be for realizing a part of the functions described above. Further, it may be a so-called difference file (difference program) that can realize the above-described functions in combination with a program already recorded in the computer system.

A part or all of the example embodiment described above can be written as in the supplementary notes below, but is not limited thereto.

(Supplementary Note 1)

An authentication device including:

a degree-of-importance information acquisition means that acquires degree-of-importance information indicating a degree of a possibility that an authentication target person approaches, for each imaging direction of a plurality of imaging devices;

an imaging device identifying means that identifies an imaging device with an imaging direction corresponding to a direction for which the degree of the possibility that the person approaches is high, based on the degree-of-importance information, as an imaging device with a high degree of importance; and a resource setting means that sets, for the imaging devices other than the imaging device with the high degree of importance, an image generation parameter to be used in generation of a captured image, to an image generation parameter with which the power consumption efficiency is increased.

(Supplementary Note 2)

The authentication device according to supplementary note 1, wherein the resource setting means sets an image generation parameter to be used in generation of a captured image for the imaging device with the high degree of importance to an image generation parameter with which authentication accuracy is increased, within a range in which total power consumption of the plurality of imaging devices is decreased.

(Supplementary Note 3)

The authentication device according to supplementary note 1, including a degree-of-importance information generation means that generates, based on a moving direction of the person, the degree-of-importance information with a high degree of importance for an imaging direction corresponding to the moving direction.

(Supplementary Note 4)

The authentication device according to supplementary note 1, including a degree-of-importance information generation means that generates the degree-of-importance information in which, based on a distance to an object, the greater the distance to the object, the higher a degree of importance of an imaging direction.

(Supplementary Note 5)

The authentication device according to supplementary note 1, including a degree-of-importance information generation means that generates the degree-of-importance information with a high degree of importance for an imaging direction corresponding to a direction in which the degree of the possibility that the authentication target person approach is high, based on geographical information.

(Supplementary Note 6)

The authentication device according to any one of supplementary notes 1 to 5, wherein the resource setting means sets the image generation parameter for lowering the frame rate used by the imaging devices other than the imaging device with the high degree of importance in the generation of the captured image, to the other imaging device.

(Supplementary Note 7)

The authentication device according to any one of supplementary notes 1 to 6, wherein the resource setting means sets the image generation parameter for lowering a compression method used in the generation of the captured image by the imaging devices other than the imaging device with the high degree of importance, to the other imaging device.

(Supplementary Note 8)

The authentication device according to any one of supplementary notes 1 to 7, wherein the resource setting means sets the image generation parameter for lowering a compression ratio used in the generation of the captured image by the imaging devices other than the imaging device with the high degree of importance, to the other imaging device.

(Supplementary Note 9)

The authentication device according to any one of supplementary notes 1 to 7, wherein the resource setting means sets an algorithm for performing authentication using a captured image acquired from the imaging devices other than the imaging device with the high degree of importance, to an algorithm with a small amount of processing.

(Supplementary Note 10)

A processing method including:

acquiring degree-of-importance information indicating a degree of a possibility that an authentication target person approaches, for each imaging direction of a plurality of imaging devices;

identifying an imaging device with an imaging direction corresponding to a direction for which the degree of the possibility that the person approaches is high, based on the degree-of-importance information, as an imaging device with a high degree of importance; and setting, for the imaging devices other than the imaging device with the high degree of importance, an image generation parameter to be used in generation of a captured image, to an image generation parameter with which the power consumption efficiency is increased.

(Supplementary Note 11)

A program that causes a computer of an authentication device to function as:

a degree-of-importance information acquisition means that acquires degree-of-importance information indicating a degree of a possibility that an authentication target person approaches, for each imaging direction of a plurality of imaging devices;

an imaging device identifying means that identifies an imaging device with an imaging direction corresponding to a direction for which the degree of the possibility that the person approaches is high, based on the degree-of-importance information, as an imaging device with a high degree of importance; and a resource setting means that sets, for the imaging devices other than the imaging device with the high degree of importance, an image generation parameter to be used in generation of a captured image, to an image generation parameter with which the power consumption efficiency is increased.

DESCRIPTION OF REFERENCE SYMBOLS

1 Authentication device
2 Imaging device
3 Distance sensor
5 Vehicle
11 Degree-of-importance information generation unit
12 Resource distribution unit
13 Vehicle information acquisition unit
14 Environmental information acquisition unit
15 Authentication part
16 Key unlocking unit

What is claimed is:

1. An authentication device comprising:

a memory configured to store instructions; and a processor configured to execute the instructions to:

acquire degree-of-importance information indicating a degree of a possibility that an authentication target person approaches, for each imaging direction of a plurality of imaging devices;

identify an imaging device with an imaging direction corresponding to a direction for which the degree of the possibility that the person approaches is high, based on the degree-of-importance information, as an imaging device with a high degree of importance;

set, for the imaging devices other than the imaging device with the high degree of importance, an image generation parameter to be used in generation of a captured image, to an image generation parameter with which the power consumption efficiency is increased;

set an image generation parameter to be used in generation of a captured image for the imaging device with the high degree of importance to an image generation parameter with which authentication accuracy is increased, within a range in which total power consumption of the plurality of imaging devices is decreased;

set an algorithm for performing authentication using a captured image acquired from the imaging devices other than the imaging device with the high degree of importance, to an algorithm with minimal processing; and based on the authentication being successful, automatically unlock a door.

2. The authentication device according to claim 1, wherein the processor is configured to execute the instructions to generate, based on a moving direction of the person, the degree-of-importance information with a high degree of importance for an imaging direction corresponding to the moving direction.

3. The authentication device according to claim 1, wherein the processor is configured to execute the instructions to generate the degree-of-importance information in which, based on a distance to an object, the greater the distance to the object, the higher a degree of importance of an imaging direction.

4. The authentication device according to claim 1, wherein the processor is configured to execute the instructions to generate the degree-of-importance information with a high degree of importance for an imaging direction corresponding to a direction in which the degree of the possibility that the authentication target person approach is high, based on geographical information.

5. The authentication device according to claim 1, wherein the processor is configured to execute the instructions to set the image generation parameter for lowering a frame rate used by the imaging devices other than the imaging device with the high degree of importance in the generation of the captured image, to the other imaging device.

6. The authentication device according to claim 1, wherein the processor is configured to execute the instructions set the image generation parameter for lowering a compression method used in the generation of the captured image by the imaging devices other than the imaging device with the high degree of importance, to the other imaging device.

7. The authentication device according to claim 1, wherein the processor is configured to execute the instructions to set the image generation parameter for lowering a compression ratio used in the generation of the captured image by the imaging devices other than the imaging device with the high degree of importance, to the other imaging device.

8. A processing method comprising:

acquiring degree-of-importance information indicating a degree of a possibility that an authentication target person approaches, for each imaging direction of a plurality of imaging devices;

identifying an imaging device with an imaging direction corresponding to a direction for which the degree of the possibility that the person approaches is high, based on the degree-of-importance information, as an imaging device with a high degree of importance;

setting, for the imaging devices other than the imaging device with the high degree of importance, an image generation parameter to be used in generation of a captured image, to an image generation parameter with which the power consumption efficiency is increased;

setting an image generation parameter to be used in generation of a captured image for the imaging device with the high degree of importance to an image generation parameter with which authentication accuracy is increased, within a range in which total power consumption of the plurality of imaging devices is decreased;

setting an algorithm for performing authentication using a captured image acquired from the imaging devices other than the imaging device with the high degree of importance, to an algorithm with minimal processing; and based on the authentication being successful, automatically unlocking a door.

9. A non-transitory computer readable recording medium that stores a program that causes a computer of an authentication device to execute:

acquiring degree-of-importance information indicating a degree of a possibility that an authentication target person approaches, for each imaging direction of a plurality of imaging devices;

identifying an imaging device with an imaging direction corresponding to a direction for which the degree of the possibility that the person approaches is high, based on the degree-of-importance information, as an imaging device with a high degree of importance;

setting, for the imaging devices other than the imaging device with the high degree of importance, an image generation parameter to be used in generation of a captured image, to an image generation parameter with which the power consumption efficiency is increased; and setting an image generation parameter to be used in generation of a captured image for the imaging device with the high degree of importance to an image generation parameter with which authentication accuracy is increased, within a range in which total power consumption of the plurality of imaging devices is decreased;

setting an algorithm for performing authentication using a captured image acquired from the imaging devices other than the imaging device with the high degree of importance, to an algorithm with minimal processing; and based on the authentication being successful, automatically unlocking a door.

\* \* \* \* \*